(12) United States Patent
Lin

(10) Patent No.: US 6,381,597 B1
(45) Date of Patent: Apr. 30, 2002

(54) ELECTRONIC SHOPPING AGENT WHICH IS CAPABLE OF OPERATING WITH VENDOR SITES WHICH HAVE DISPARATE FORMATS

(75) Inventor: Simon M. Lin, Andover, MA (US)

(73) Assignee: U-Know Software Corporation, Woburn, MA (US)

( * ) Notice: Subject to any disclaimer, the term of this patent is extended or adjusted under 35 U.S.C. 154(b) by 0 days.

(21) Appl. No.: 09/414,277

(22) Filed: Oct. 7, 1999

(51) Int. Cl.[7] .............................................. G06F 17/30
(52) U.S. Cl. ................................................ 707/4; 707/3
(58) Field of Search .............................. 707/4, 3, 2, 1, 707/5, 10, 102, 104; 705/1, 26, 27

(56) References Cited

U.S. PATENT DOCUMENTS

| | | | | |
|---|---|---|---|---|
| 6,119,101 A | * | 9/2000 | Peckover | 705/26 |
| 6,185,558 B1 | * | 2/2001 | Bowman et al. | 707/5 |
| 6,301,584 B1 | * | 10/2001 | Ranger | 707/103 |
| 6,304,854 B1 | * | 10/2001 | Harris | 705/27 |
| 6,317,718 B1 | * | 11/2001 | Fano | 705/1 |

* cited by examiner

*Primary Examiner*—Sanjiv Shah
(74) *Attorney, Agent, or Firm*—Kudirka & Jobse, LLP

(57) ABSTRACT

A shopping bot uses real time agents that automatically contact disparate web pages representing vast variety of different categories and merchants and retrieve and unify the information therein for display when a request for the information is made. Consequently, there is no need to create a "wrapper", or a "information adapter" for each category or each merchant because the same agent can retrieve and process information in various formats. In particular, the shopping bot generates queries from keywords entered by a user and a database of URL information. Information returned by the queries is filtered, parsed and mapped to a standard format. The formatted information can then be displayed. Since the information is converted to the standard format in real time, the invention allows quick addition of online merchants and additional product categories can be added quickly and easily. Further, information about a product item can be easily enlarged as market needs increase without changing a database of codes one-by-one. In accordance with one embodiment, the database of URL information includes URLs specific to site directories at each merchant site so that queries can be easily generated by appending user-provided keywords.

25 Claims, 7 Drawing Sheets

ELECTRONIC SHOPPING AGENT WHICH IS CAPABLE OF OPERATING WITH VENDOR SITES WHICH HAVE DISPARATE FORMATS

FIELD OF THE INVENTION

This invention relates to electronic shopping agents or "bots" which operate over the Internet on behalf of a client to locate on-line vendors which provide goods and services of interest to the client.

BACKGROUND OF THE INVENTION

The Internet and web-related technology have become widespread as personal computers have become more prevalent. One of the fastest growing business sectors is electronic commerce, particularly, retail consumer shopping. The Internet allows consumers to quickly locate goods and services of interest to them. In many cases, images of the goods can be viewed and orders placed directly over the web. The consumer may provide payment electronically via credit cards and the goods are then shipped to the consumer. Comparative shopping using the Internet as a search and retrieval tool to locate and retrieve information and prices for comparable products is also a fast-growing area. There are already several comparative shopping tools that are available on the Internet, such as Junglee and Jango, for example. These shopping tools accept keywords and category information as inputs from consumers. The keywords and category information are used to create an autonomous agent or "shopping bot" which scans over the Internet and locates related products from a set of online merchants. The product items that are located are returned by the shopping bot are then presented to the consumer using a simple tabular form to enable comparison shopping.

While the existing shopping tools can help users to do comparative shopping, there are several limitations among all the existing shopping bots. The first limitation is that the number of online merchants included in the comparison pool that a user can access and use for comparisons is small. This limitation can be mainly attributed to a historical fact, i.e. the evolution of the Internet. The Internet was originally designed to operate with information coded in a very specific format called HyperText Markup Language (HTML). HTML is a presentation language that uses codes embedded in the document to define how a particular segment of a document is presented on a display mechanism such as a Web browser. Although HTML has a predefined and fixed format, it does not give any information about the meaning or semantics of the information which it is used to format. Therefore, although Web browsers can read HTML and use the HTML codes to identify selected parts of the information, such as text and graphics, the browsers cannot use the HTML codes to extract information from the identified document parts. In addition, web pages often differ drastically depending on the taste, preference, and marketing needs of different designers and merchants.

As a result, it is difficult and tedious for a search engine to extract specific information, such as item price, from a wide variety of different HTML coded web pages. In order to overcome this problem, some shopping bots use mechanisms such as so-called "wrappers" or "information adapters." One of these mechanisms is programmed to discover or "learn" about each product category in each merchant site. However, these mechanisms are very slow and it usually takes from hours to days to include a new merchant in the comparison pool. Furthermore, if the merchant changes its web page formats, it will take also a long time to change the mechanism used for that merchant site in order to make the search engine continue to work. The continual flux of the Internet requires the shopping bot providers to employ many programmers to design and maintain their services and the number of merchant sites covered is necessarily small.

The second limitation is the amount of information a consumer can get through existing shopping bots. Currently, most shopping bots provide consumers with only limited information such as price, a brief description of items, and a merchant link. However, from consumer's point of view, price may not be the only criteria on which to base a shopping decision. Other factors, such as shipping date, warranty information, creditability of a merchant, and service, etc. often affect shopping decisions. Although it is possible to add additional criteria to existing shopping bots, it means changing hundreds or thousands of "wrappers" or "information adapters" corresponding to different categories, subcategories, and merchant sites. Such a task is a very costly investment both in terms of time and human resources.

The third limitation on existing shopping bots is performance and accuracy of searched results. Most existing shopping bots are very slow and take minutes to generate search results. Consequently, many existing systems store information retrieved from merchant sites in a local database so that searches are greatly accelerated. However, the local databases are only periodically updated by contacting the merchant sites. Therefore, the results of the search are often out-of-date and not very accurate or not related to the actual situation at the merchant site.

Therefore, there is a need for a shopping bot which can operate with a variety of different merchant site formats and which can quickly adapt to new formats or changes to existing merchant sites.

There is further need for a shopping bot which can be easily and quickly modified to retrieve and display new and different information from that currently being displayed.

There is a further need for a shopping bot which can quickly provide accurate and timely information to consumers.

SUMMARY OF THE INVENTION

In accordance with the principles of the invention, a shopping bot uses real time agents that automatically contact disparate web pages representing vast variety of different categories and merchants and retrieve and unify the information therein for display when a request for the information is made. Consequently, there is no need to create a "wrapper", or a "information adapter" for each category or each merchant because the same agent can retrieve and process information in various formats.

In particular, the shopping bot generates queries from keywords entered by a user and a database of URL information. Information returned by the queries is filtered, parsed and mapped to a standard format. The formatted information can then be displayed. Since the information is converted to the standard format in real time, the invention allows quick addition of online merchants and additional product categories can be added quickly and easily. Further, information about a product item can be easily enlarged as market needs increase without changing a database of codes one-by-one.

In accordance with one embodiment, the database of URL information includes URLs specific to site directories at each merchant site so that queries can be easily generated by appending user-provided keywords.

In accordance with another embodiment, information which is retrieved from merchant sites comprises information which would normally be displayed by a browser. This information which is typically in HTML or XML format is parsed and filtered and a hierarchical tree structure is used to map the information to desired categories before displaying the information for comparison.

In accordance with still another embodiment, efficient caching and distributed algorithms are used to reduce consumer response time.

BRIEF DESCRIPTION OF THE DRAWINGS

The above and further advantages of the invention may be better understood by referring to the following description in conjunction with the accompanying drawings in which.

DETAILED DESCRIPTION

Figure 1:
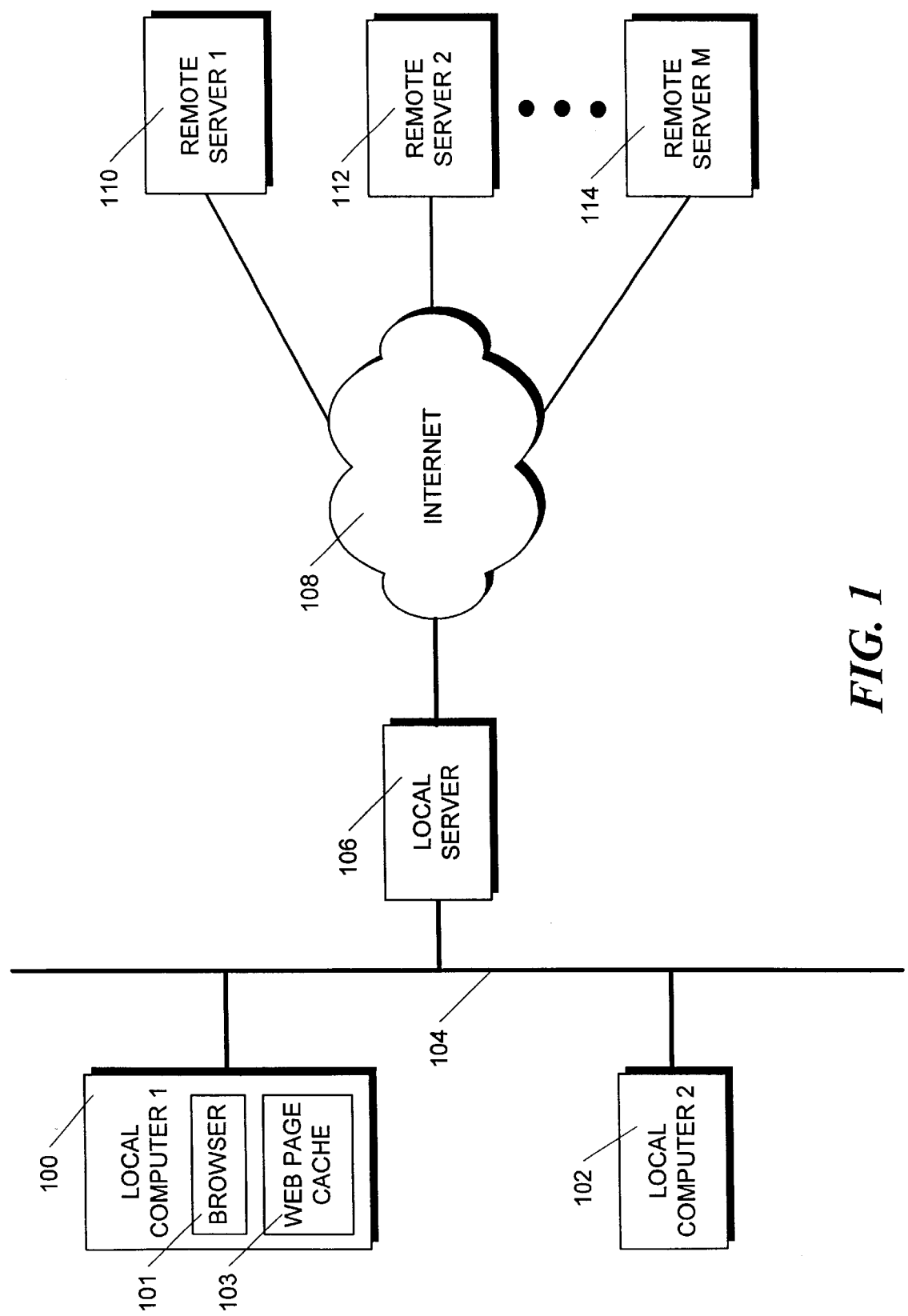
FIG. 1 is a block schematic diagram of a networking arrangement which includes the Internet and connects several local computer systems to remote servers.

FIG. 1 shows a commonly used network arrangement in which local computer systems 100 and 102 are connected by a local area network (LAN) 104 to a local server 106 which may access a plurality of remote servers 110–114 through the Internet 108. Each remote server 110–114 may include World Wide Web sites (web sites) that each include a plurality of World Wide Web pages (web pages). Each local computer system 100 and 102, of which system 100 is shown in more detail, may access the remote web sites with web browser software 101, such as Netscape Navigator™, available from Netscape Communications Corporation of Mountain View, Calif. or Internet Explorer available from Microsoft Corporation, Redmond, Wash.

A web site has a home page which constitutes the highest level in the hierarchy. The home page typically contains general information about the merchant, including graphic images and may contain other information such as a menu allowing a user who visits the web site to navigate to the other web pages that constitute the site. The site may also include a site directory that is a web page that contains links to the other web pages. Often a site directory includes a site search feature which is an integral search engine that accepts user input in the form of keywords and searches the site for matches. Information of use to a consumer, such as item descriptions and prices would typically be located on lower levels of the hierarchy. Ordering information, such as credit card information might be located at still another level of the site.

The World Wide Web is actually a collection of servers on the Internet 108 that utilize the Hypertext Transfer Protocol (HTTP). HTTP is a known application protocol that provides users with access to files (which can be in different formats, such as text, graphics, images, sound, and video) using a standard page description language known as Hypertext Markup Language (HTML). Among a number of basic document formatting functions, HTML allows software developers to specify graphical pointers on displayed web pages (commonly referred to as "hyperlinks") that point to other web pages resident on remote servers. Hyperlinks commonly are displayed as highlighted text or other graphical image on the web page. Selection of a hyperlink with a pointing device, such as a computer mouse, causes the local computer to download the HTML code of an associated web page from a remote server. The location of the web page is expressed as a "uniform resource locator" (URL). This method provides the remote server with the necessary information to upload the remote web page associated with the selected point to the local computer.

Web sites constructed by on-line merchants contain descriptions and or pictures of goods or services for sale. Each site is typically arranged in a hierarchical branching tree structure having a plurality of nodes that contain one or more of the web pages in the site. Each of the nodes in the site are considered to be on various levels of each branch in the tree structure. For example, a first node is considered to be on a lower level than a second node in the same branch if a web page in the first node includes the second node in its URL. Conversely, a third web node in the same branch is considered to be on a higher level than the second node if the URL of a web page in the second node includes the third node. Web pages are accessed over the Internet, via the browser software 101, and commonly are downloaded into a cache 103 of the local computer system 100. The browser software 101 then uses the HTML code to position the various files on a display screen.

Figure 2:
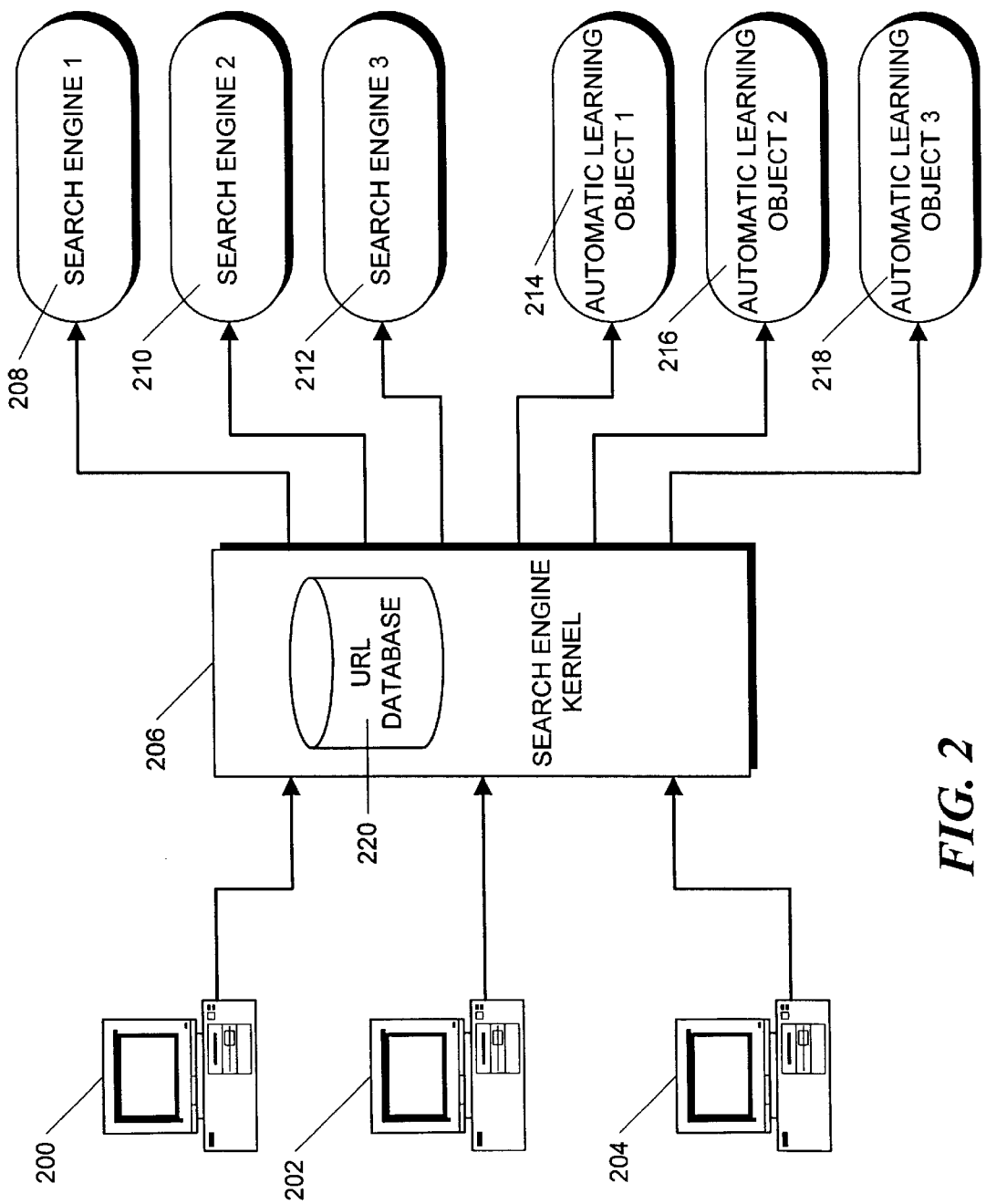
FIG. 2 is a block schematic diagram which illustrates the major components of the inventive shopping system.

The inventive shopping system is illustrated in FIG. 2 and consists of a search engine kernel (SEK) 206, one or more search engines 208–212 and one or more automatic learning objects (ALOs) 214–218. The kernel 206 might be located in the local server (106, FIG. 1) and interacts with one or more users 200–204 to receive a user's request for information and to send the results back to the requesting user. Preferably, the SEK 206 is platform independent so that it can run on any hardware platform and operating systems. In one embodiment, the SEK 206 is written in the Java programming language licensed by Sun Microsystems, Inc. and can operate on any platform as long as a Java environment is operating on that platform.

The SEK 206 first analyzes a request generated by a user and then starts appropriate functions according to the user's request. For example, the SEK 206 might receive a request for information relating to books on a particular topic, such as "child spousal support" from one of users 200–204. The request criteria are entered by the user in a variety of manners. The criteria could be entered, via an interactive interface in which the user answers a series of questions based on keywords. Alternatively, the user might use drop-down lists and menus to select a predefined category, such as "books" from a list or a graphic display of items. Generally, the request would include at least a category, such as "book" or "auto" and selected keywords, such as "child", "spousal" and "support" or a phrase "child spousal support" which can be broken down by a conventional parser into one or more keywords.

In response, the SEK 206 generates one or more queries relating to the selected topic. In order to generate these queries, the SEK 206 uses an internal database 220 of URLs.

This database can include entries set up be participating vendors, or might be a manually downloaded table, or provided by the company which maintains the inventive shopping system. The database 220 contains a plurality of URLs arranged by category. When a category is entered by a user, the URLs for that category are returned by the database 220.

In accordance with an important aspect of the invention, the URLs stored in database 220 are not the URLs for a particular merchant site, but are instead the URLs for the site directory and, in particular, for the site search of each site. These URLs can be easily combined with the keywords entered by the user to form a query. This latter query utilizes the internal search engine existing at most merchant sites to perform at least part of the search, thereby relieving the inventive system of having to construct a query which is specific to each merchant site. For example, continuing the above example, if the user has selected the category "books." The SEK 206 might retrieve the URLs for online book vendors such as amazon.com and kingbooks.com from the database 220. However, the URLs actually retrieved from the database 220 are the URLs for the search engines at these sites:

http://www.amazon.com/exec/obidos/external-search/? and http://www.kingbooks.com/scripts/search3.exe?by= keywords&

These URLs are in a form which can readily be combined with the keywords entered by the user in order to form a query such as:

http://www.amazon.com/exec/obidos/external-search/ ?keyword=child+spousal+support and http://www.kingbooks.com/scripts/search3.exe?by= keywords&keywords=child+spousal +support These queries are advantageous because they use the built-in search engines in the respective web sites to perform the actual search, thus relieving the SEK from having to compose a customized search for each site and changing the customized search when the site changes.

However, some merchant sites do not have an internal search engine. Instead, some sites have an on-line catalog while other sites are simple web pages. In the case where the merchant site has a catalog, it may be necessary for a programmer to enter the site and navigate to a section of the catalog where user selections can be made. The URLs which correspond to these catalog sections can then often be combined with the user-entered keywords to generate the required query. Database 220 may contain several URLs for a single merchant site where each URL is mapped to one or more keywords. When a user enters the keywords for the query, the keywords are used to select from the URLs for a merchant site and then the final query is generated by combining the selected keywords with the user enter information.

In the case where the merchant site is a simple collection of web pages, a programmer must enter the site and navigate directly to a web page which displays an item. The URL which identifies this latter web page is then entered into the database 220 and mapped to various keywords selected from the web page content. Subsequently, when a user enters keyword information, the information is used to select URLs from the database 220 which are mapped to matching keywords. This latter approach is not as advantageous as using an internal site search because the mapping must be changed if the merchant site is changed.

Figure 3A:
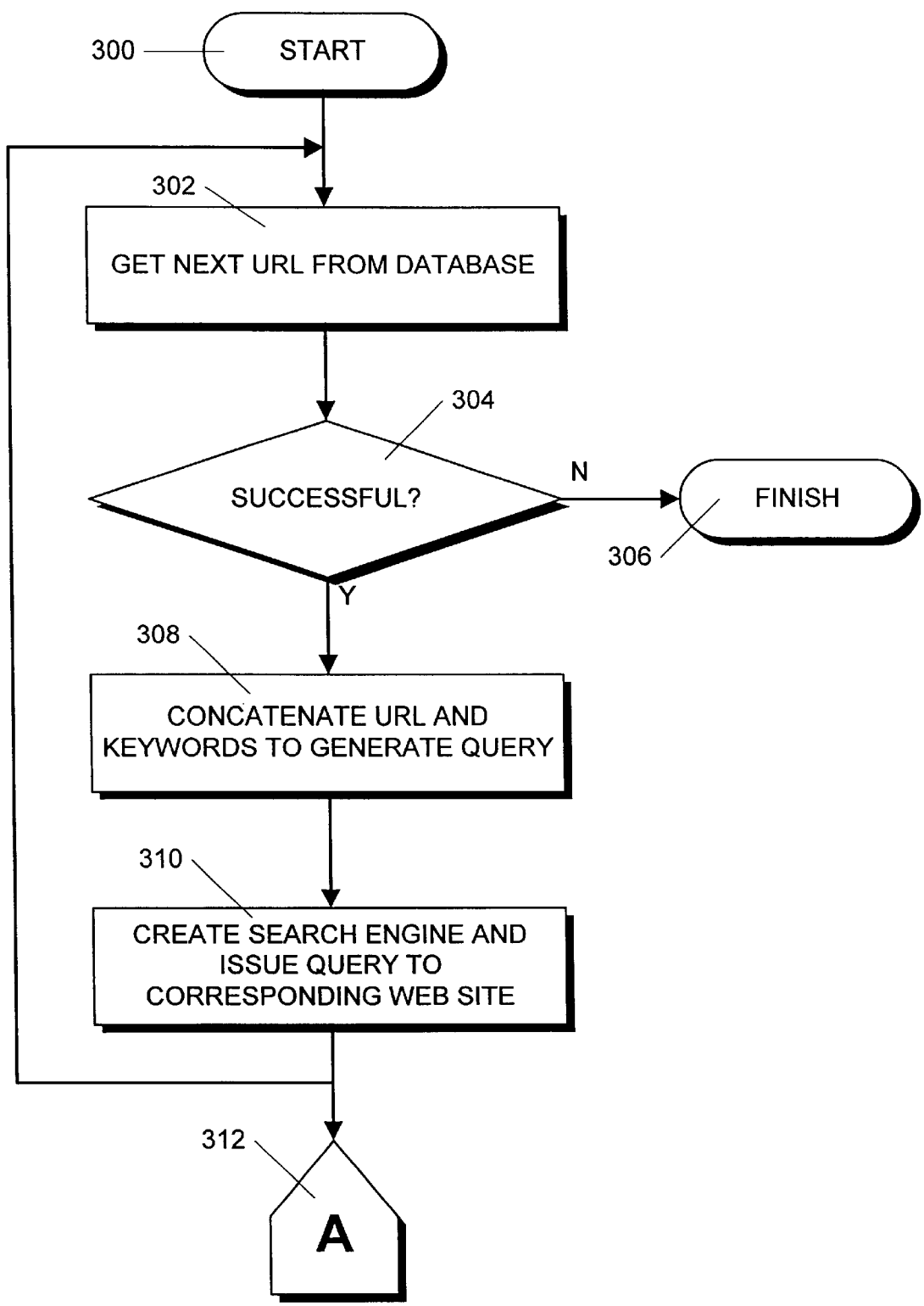
FIGS. 3A and 3B, when placed together, form a flowchart which illustrates the inventive process of generating queries in parallel from stored URLs issuing the queries to merchant sites and processing the results in parallel.

As previously mentioned, a keyword for a merchant site is selected based on the user-selected category and a query is formed using the URL which matches the keyword for the merchant site. In this manner queries are generated for each merchant site having a URL in the selected category. When each query is generated, the SEK spawns a search engine thread, for example, search engine 208 and provides it with the query for a merchant site. The search engine 208 issues the query to the appropriate merchant site. In response, the merchant site returns the results of the query. The results from a merchant site are received by the search engine 208 that issued the query and forwarded to the SEK 206. When results are received, the SEK creates an ALO, for example ALO 214 for each merchant site. The ALOs process the results to extract relevant information. The extracted information is returned to the SEK 206 for display formatting. Finally, the formatted results are returned to the one of users 200–204 which made the initial request. The entire process is illustrated in the flowchart shown in FIGS. 3A and 3B, which, when placed together, form the flowchart.

The process starts in step 300 and proceeds to step 302 where an attempt is made to retrieve a merchant URL from the SEK database 220 under the category which has been selected by the user. In step 304, a check is made to determine whether the attempt was successful. If no additional URLs remain and the attempt is not successful, the process proceeds to step 306 and finishes.

Alternatively, if, in step 304, an additional URL is retrieved from database 220, then the process proceeds to step 308. In step 308, a query is generated by concatenating the URL and the keywords entered by the user to generate a query. As previously mentioned, in many cases, this query will be directed towards a site search engine located at the merchant site. Next, in step 310, a local search engine thread is created which issues the query to the corresponding web site. The process then proceeds back to step 302 to retrieve another URL and generate another search engine thread.

Figure 3B:
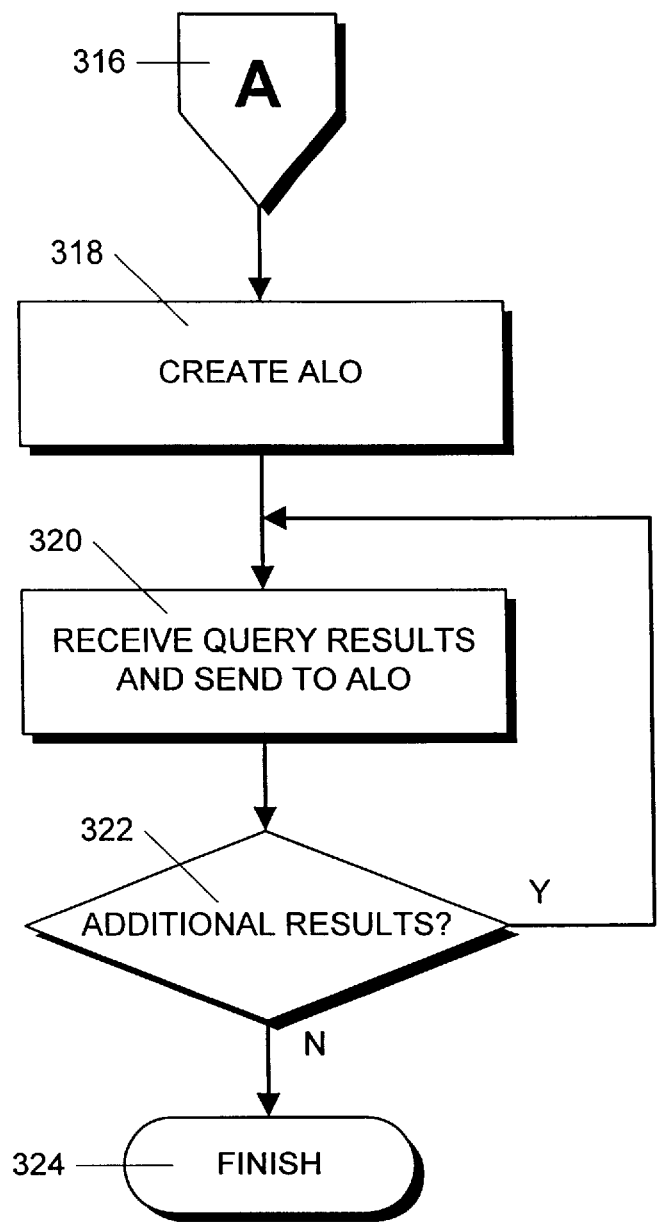

The operation of each search thread is illustrated in FIG. 3B. In particular, the process proceeds, via off-page connectors 312 and 316 to step 318 in which the SEK creates an automatic learning object to receive the search results from a merchant site. The query results generated by the merchant site search engine are received by the search engine and forwarded to previously-created ALO as set forth in step 320. Data from a site may not be returned all at once, but processing begins by the ALO as soon as data are received.

In step 322, the local search engine which issued the query then waits to determine whether additional results will be provided by the merchant site. If additional results are received, then step 320 is repeated. Alternatively, if there are no additional results as determined in step 322, the process finishes in step 324.

The SEK 206 keeps track of all ALOs 208–212 generated and performs the necessary synchronization between the ALOs 208–212. Advantageously, the search process is conducted in parallel with each query being processed by a separate search engine thread and the corresponding results are processed by a separate ALO. This parallel processing greatly reduces the time required to obtain comparative results. In addition, the procedure that receives a request message from a user and initiates a search engine is kept very short so that it takes minimum amount of time. Various ALOs in the SEK share the same resources making inter process communication more efficient and eliminating unnecessary mapping.

Based on the category, subcategory, product name, and other related information provided by the user, the SEK 206 initiates one or more search engines 208–212 that examine all merchant sites that may have the product information requested by the user. Each search engine takes a query generated by the SEK and goes to the associated web site to retrieve the desired information. In general, the information retrieved from a web site by the aforementioned queries is intended for display by a browser. Often the information will be encoded using "markup languages" such as HTML or XML or other presentation languages.

HTML is a simple "markup language" that is suited for the display of small and reasonably simple documents which are commonly transmitted on the World Wide Web. Another markup language called the Extensible Markup Language (XML) is often used for more complicated documents that require capabilities beyond those provided by HTML. XML is more extensible, allows for validation and defines how URLs can be used to identify component parts of XML documents.

HTML and XML documents are composed of a series of entities or objects. Each entity can contain one or more logical elements and each element can have certain attributes or properties that describe the way in which it is to be processed. Both languages provide a formal syntax for describing the relationships between the entities, elements and attributes that make up a document. This syntax tells a computer how to recognize the component parts of each document.

HTML and XML use paired markup tags to identify document components. The markup tags are easily recognized codes that are added to a document to identify each document component. In particular, the start and end of each logical element is clearly identified by entry of a start-tag before the element and an end-tag after the element. For example, the tags <to> and </to> could be used to identify the "recipient" element of a document in the following manner:

document text . . . <to>Recipient</to> . . . document text.

The arrangement of tags is hierarchical in that some tagged document portions can contain other tagged document portions. In order to operate with a set of tags, users need to know how the markup tags are delimited from normal text and the relationship between the various elements. For example, in some XML systems, elements and their attributes are entered between matched pairs of angle brackets (< . . . >), while element references start with an ampersand and end with a semicolon (& . . . ;). In HTML the set of markup tags is fixed and relatively small. In XML documents, the form and composition of markup tags can be defined by users, but are often defined by a trade association or similar body in order to provide interoperability between users. XML tag sets are based on the logical structure of the document and, consequently, they are easy to read and understand.

XML can represent a greater variety of documents and, since different documents have different parts or components, it is not practical to predefine tags for all elements of all documents. Instead, documents can be classified into "types" which have certain elements. A document type definition (DTD) indicates which elements to expect in a document type and indicates whether each element found in the document is not allowed, allowed and required or allowed, but not required. By defining the role of each document element in a DTD, it is possible to check that each element occurs in a valid place within the document. For example, an XML DTD allows a check to be made that a third-level heading is not entered without the existence of a second-level heading.

It would be convenient if the tags in the information returned from the aforementioned queries identified sections of the document which were relative to the inventive shopping bot, such as item description, price, etc. However, in most cases, the information returned is coded for display on a browser and must be processed further to extract the desired shopping information. An example of information returned from a query is given below. This information is coded using HTML codes and is intended for use by a browser such as the Netscape or Internet Explorer browsers mentioned previously.

```
<html>
<head>
<title> Books Found by Search</title>
<head>
<body bgcolor="#FFFFFF">
<div align="center"><center>
    <table border="0" width="750">
    <tr>
        <td width="375"><font color="#000000" size="5"><strong>
            Books Found by Search:<br>
    <br>
    </strong></font><font color="#000000" size="3">
            Your search brought up 1 titles.<br>
            Click on a title for more information.</font></td>
    <td valign="top" width="375"><font size="4">
            <img src="/images/future.gif" width="20" heig ht="20">
             This icon represents new and upcoming releases.<br>
    </font>For current availability info, please click on the title.</td>
    </tr> </table>
    <table border="0" width="750">
        <tr><td width="750">
        Your search result is sorted by publication date with most recent one first.
</td></tr></table></center></div>
<!--ISBN:0944058316-->
        <div align="center"><center>
<table border="0" width = "750">
<tr>
        <td width="40"><font size="4"><strong>1.</strong></font></td>
        <td width="710" colspan="5"><a name="0370994"
        href="/scripts/detail4.exe?/results/b9bflcb4.html-0370994">
```

-continued

```
                <font size="4">How to Settle Child and Spousal Support; With CalSupport
                Software With 3.5 Disk</font></a></td>
        </tr>
        <tr>
                <td width="40"> </td>
                <td width="710" colspan="5">Author:sherman, Ed ~
                Subject: Domestic Relations - Divorce & Separation ~ Pub. Date;
                1/1998</td>
        </tr>
        <tr>
                <td width="40"> </td>
                <td width="710" colspan="5">Pub.Price:$29.95 ~
                                        Kingbooks.com Price:
                                        <font color="#FF0000">$23.96</font>
                                        <font color="#000000">~</font>You Save:
                <font color="#FF0000">$5.99</font></td>
        </tr>
        </table></center></div>
                <div align="center"><center>
                <img src="images/redline.gif" width="750" height="4">
</center></div></body></html>
```

Figure 4:
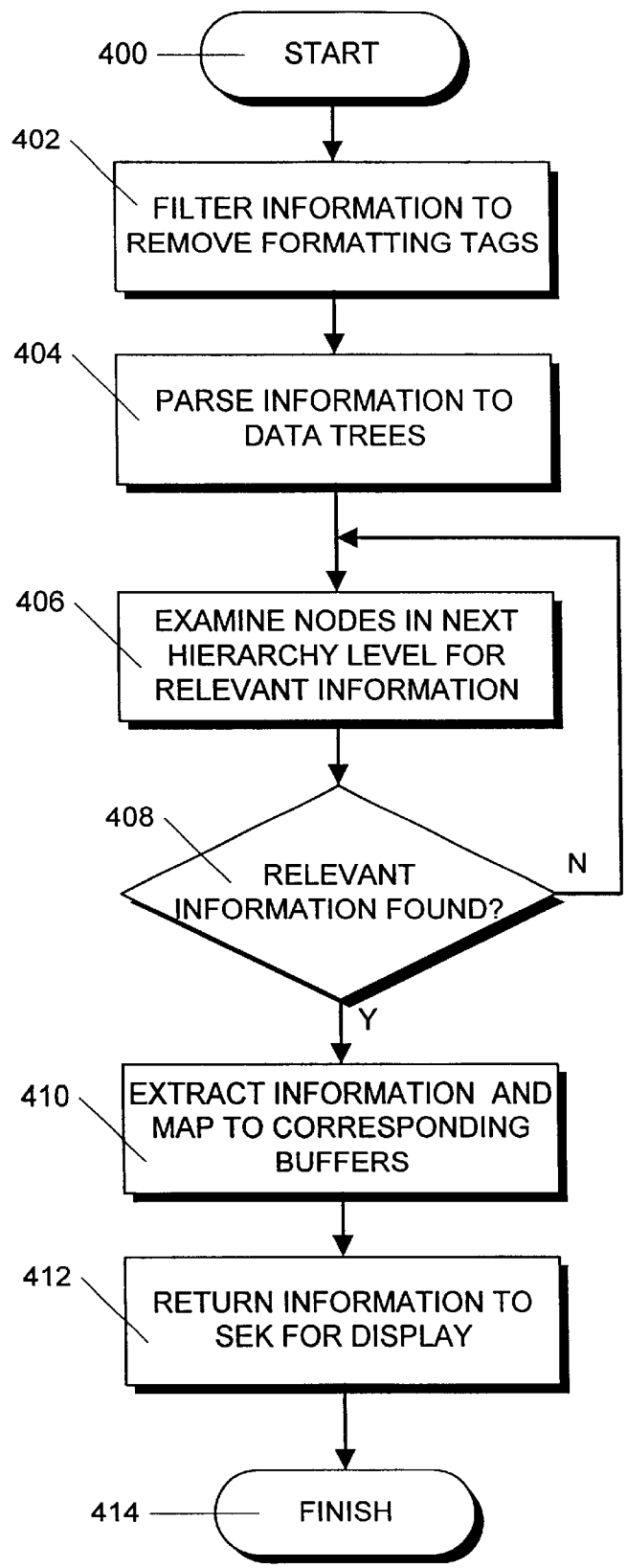
FIG. 4 is a flowchart which illustrates the process of extracting relevant information from query results.

This information must be processed in order to extract the relevant information a procedure performed by an ALO. As previously mentioned a separate ALO thread is spawned for each result set received by the SEK 206 in order to reduce processing time. An illustrative processing routine is illustrated in the flowchart shown in FIG. 4. The routine starts in step 400 and proceeds to step 402. In step 402 a filtering mechanism removes formatting information and attributes.

This filter can be implemented with a parsing mechanism which identifies the tags. Such a parsing mechanism is well-known for presentation languages, such as HTML and XML. Next, the identified tags are compared to a predetermined tag list and the formatting tags, such as <html>, <head>, <title>, <font>, <br>, etc. are removed. In addition, formatting attributes in the tags are also removed. In the case of the above example, the remaining information will be:

```
<table>   <tr>
                  <td
                          Books Found by Search:
                          Your search brought up 1 titles.
                          Click on a title for more information.
                  </td>
                  <td>
                          This icon represents new an upcoming releases.
                          For current availability info, please click on the title.
                  </td>
          </tr>
</table>
<table>   <tr>
                  <td>
                          Your search result is sorted by publication date with most
                          recent one first.
                  </td>
          </tr>
</table>
<table>   <tr>
                  <td>
                          1.
                  </td>
                  <td>
                          <a name="0370994"
                          href="/scripts/detail4.exe?/results/b9bflcb4.html-
                          0370994">How to Settle Child and Spousal Support; With
                          CalSupport Software With 3.5 Disk
                  </td>
          </tr>
          <tr>
                  <td>
                          ;
                  </td>
                  <td>
                          Author: Sherman, Ed Subject: Domestic Relations -
                          Divorce & Separation Pub. Date; 1/1998
                  </td>
          </tr>
          <tr>
                  <td>
```

-continued

```
        </td>
        <td>
                Pub.Price:$29.95 ~ Kingbooks.com Price: $23.96 ~ You
                Save: $5.99
        </td>
    </tr>
</table>
```

Next, as indicated in step 404, the remaining information is parsed into a data tree. In the case of HTML and XML, the language is naturally hierarchical so that this parsing is relatively easy. The example given immediately above splits into three separate trees which are comprised of hierarchical nodes indicated by the indented sections (the indents were added to emphasize the sections.) These trees are illustrated in FIGS. 5,6 and 7 and are delineated by the <table></table> tags.

Figure 5:
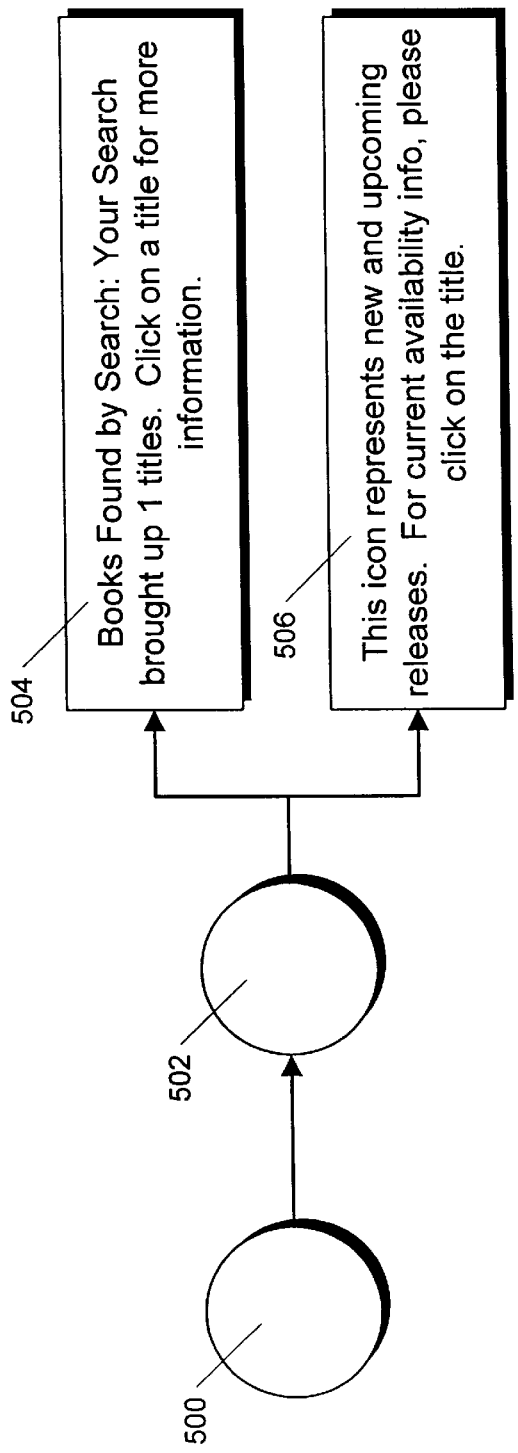
FIG. 5 is a schematic diagram of information in an example tree branch having three node levels.

FIG. 5 illustrates the first tree comprised of a first node 500 consisting of information contained between the <table></table> tags, a second node 502 delineated by the <tr></tr> tags and two third nodes, 504 and 506, delineated by the <td></td> tags. In a similar manner, FIG. 6 illustrates the first tree comprised of a first node 600 consisting of information contained between the <table></table> tags, a second node 602 delineated by the <tr></tr> tags and a third node 604 delineated by the <td></td> tags. FIG. 7 illustrates the third tree comprised of a first node 700 consisting of information contained between the <table></table> tags, three second nodes 702, 704 and 706 delineated by the <tr></tr> tags and six third nodes 708–718 delineated by the <td></td> tags.

As set forth in step 406, the nodes in each tree are examined to determine whether they contain relevant information. These nodes are examined in sequence, level-by-level, as illustrated by the arrows in the figures to detect a "complete" node level which contains some or all of the desired information. For example in FIG. 5, node 500 is first examined. Since it is empty, node 502 at the second level is next examined. It is also empty so that nodes 504 and 506 at the third level are examined. Nodes 504 and 506 contain information and this information is examined as discussed below. However, since the information contained in nodes 504 and 506 is not relevant information, such as the title, author or price of a book in the example given above, the entire tree, including nodes 500 and 502 is removed from consideration. If no relevant information is found as determined in step 408 (FIG. 4), then the process proceeds back to step 406.

Figure 6:
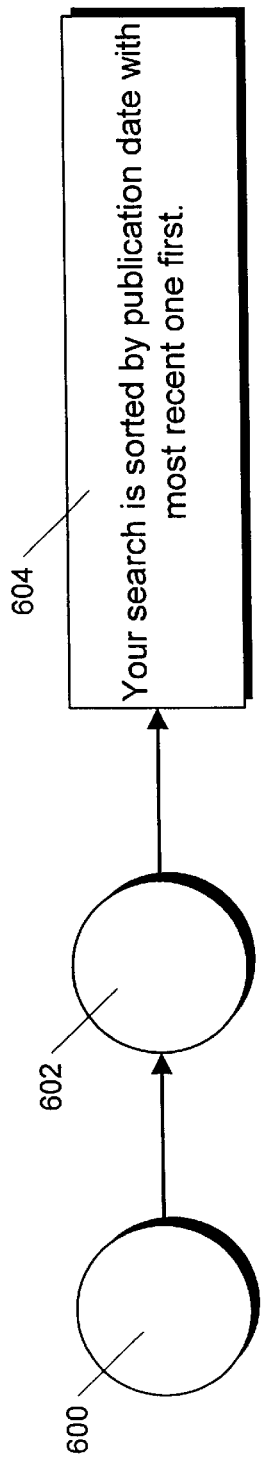
FIG. 6 is a schematic diagram of information in another example tree branch having three nodes.
Figure 7:
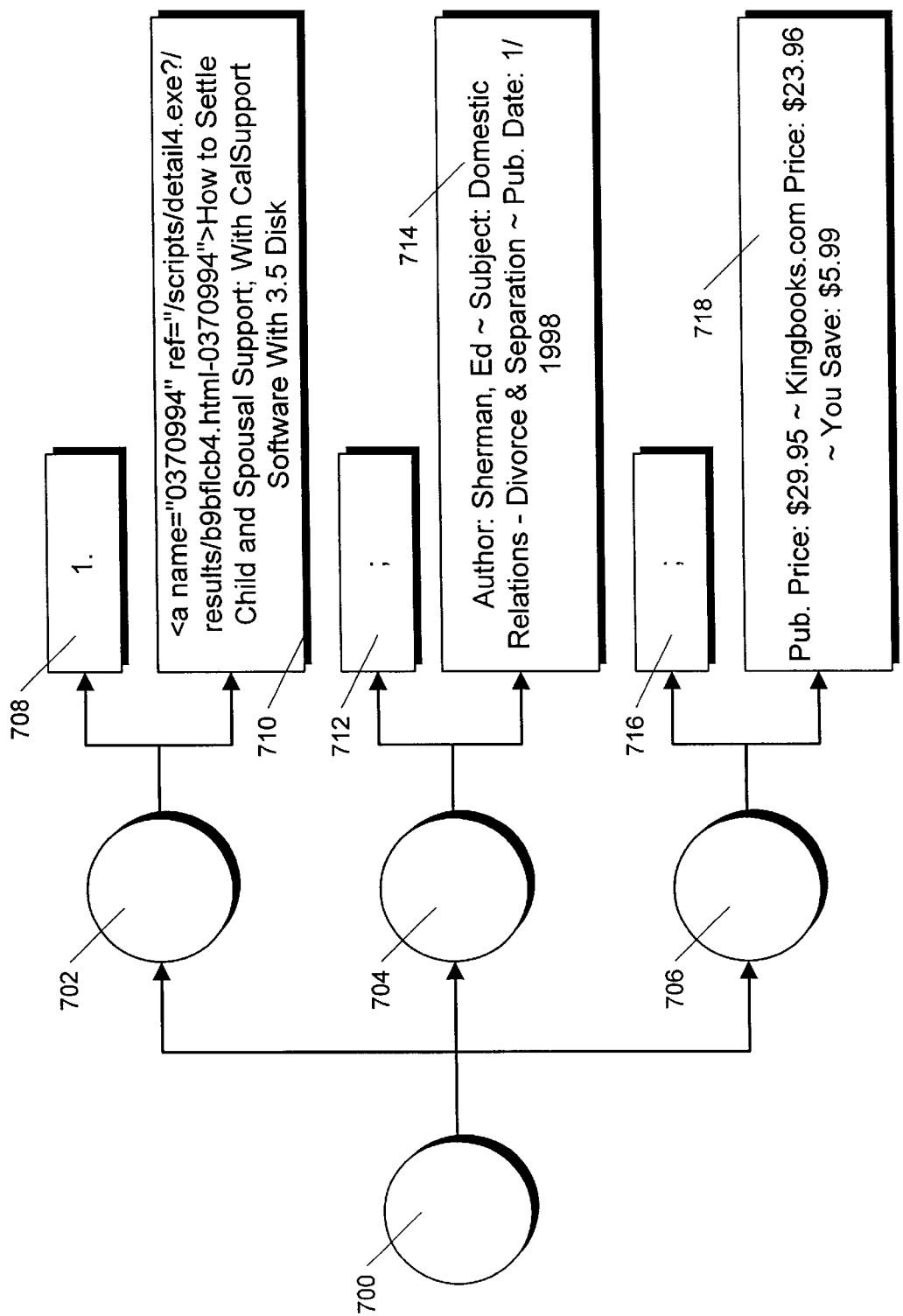
FIG. 7 is a schematic diagram of information in a further example tree branch also having three nodes.

Next, in step 406, the tree illustrated in FIG. 6 is examined. Node 600 is first examined. Since it is empty, node 602 is next examined. It is also empty so that node 604 is examined. Node 604 contains information and this information is examined as discussed below. However, since node 604 does not contain relevant information, the entire tree, including nodes 600 and 602 is removed from consideration. The process then continues from step 408 back to step 406.

Next, the tree illustrated in FIG. 7 is examined. Node 700 is first examined. Since it is empty, nodes 702, 704 and 706 are examined. These nodes are also empty so that nodes 708–718 are examined. All of these nodes contain information which is examined. Nodes 710, 714 and 718 contain relevant information so that, in step 410, this information is extracted by an extraction mechanism and mapped to corresponding buffers. In the above example, the result would be:

| Title | Author | Description | Price |
|---|---|---|---|
| How to Settle Child and Spousal Support; With CalSupport Software With 3.5 Disk | Sherman, Ed ~ | Domestic Relations - Divorce & Separation ~ Pub Date: 1/1998 Pub. Price: $29.95 | $23.96 |

In step 412, the buffered information is returned to the SEK where it is formatted for display on the user's computer. The process then ends in step 414. In order to extract the information in each node, the information is checked against a rules set which is specific to the category which is being examined. Each rule in the set defines the character of one or more fields. For example, one rule might specify that a node is complete if it contains all relevant fields. In the aforementioned example, these fields are title, author, description and price. If one field is missing, another rule might require further checking to determine whether the node is complete and information from that node should be extracted. For example, if a price field and a name field are found in a node, the node is very likely to contain relevant data.

Within each node relevant information is located by searching for keywords, symbols or data types which are specific to each category. Then, words in the vicinity of these keywords could be examined to find relevant information. For example, each node may be examined for character strings such as "name", "title", "description", "price", or "author." If any of these keywords are found, then the subsequent characters will be considered relevant information. Another rule might define a price field as the smallest number encountered in the node with, or without, a preceding "$" symbol. A price field may also be defined as a number with or without a preceding "PRICE" keyword.

The rules can be generated in a variety of ways. In one embodiment, rules are generated by a programmer for each merchant site and maintained by the programmer. In this embodiment, the ALO which is processing the received data will look for a rule in the rule set which matches the data and use the rule to extract the data. In another embodiment, the search results are parsed to tree nodes as described above and the ALO will check each node for keywords which are selected from a keyword set which depends on the user-selected category. The information following these predetermined keywords is then extracted. In this version, separate rules are not needed for each site and the rules do not need to be maintained by a programmer.

Alternatively, provision can be made to allow a user to manually select a block of data in a particular level of a data tree so that program can search and extract that block of data each time results are returned. Because rules can be written for each field, each ALO is very flexible and generic. This flexibility allows different merchants to be added into the search and comparison pool quickly and easily. It also allows different information to be retrieved from a site depending on the customer or marketing needs.

In an alternative embodiment, the system may be implemented as a computer program product for use with a computer system. Such implementation may include a series of computer instructions fixed either on a tangible medium, such as a computer readable media (e.g., a diskette, a CD or non-volatile storage) or transmittable to a computer system, via a modem or other interface device, such as a network. The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it will be apparent to those skill in the art that various changes and modifications can be made that will achieve some of the advantages of the invention without departing from the true scope of the invention. These and other obvious modifications are intended to be covered by the appended claims.

What is claimed is:

1. Apparatus for retrieving comparative item information from a plurality of merchant sites having disparate information formats in response to a request, including a category and a keyword, from a user, the apparatus comprising:

a database containing a plurality of categories and, for each category, at least one URL for one of the plurality of merchant sites;

a query generator responsive to the request category for composing a query by concatenating a URL obtained from the database with the request category with the request keyword wherein the query generator composes a plurality of queries for the requested category;

a search engine for retrieving information from the plurality of merchant sites with the query; and an automatic learning object for processing retrieved information to extract the item information and wherein a plurality of automatic learning objects are created in parallel with automatic learning object being created to process information retreived from each query.

2. Apparatus according to claim 1 wherein the query generator composes a plurality of queries for the requested category and wherein a plurality of search engines are created in parallel with one search engine being constructed for each query.

3. Apparatus according to claim 1 wherein the automatic learning object comprises:

a filter for removing formatting information in the retrieved information; and a parser for parsing the filtered information into one or more data trees, each data tree having one or more nodes.

4. Apparatus according to claim 3 wherein the automatic learning object further comprises:

a mechanism which examines each node for relevant information; and an extraction mechanism which extracts the item information from the relevant information.

5. Apparatus according to claim 1 wherein the retrieved information is coded in HTML code and wherein the automatic learning object processes the HTML code to remove HTML formatting tags.

6. Apparatus according to claim 1 wherein the retrieved information is coded in XML code and wherein the automatic learning object processes the XML code to remove XML formatting tags.

7. Apparatus according to claim 1 wherein the database includes at least one URL for a search engine located in one of the plurality of merchant sites.

8. A method for retrieving comparative item information from a plurality of merchant sites having disparate information formats in response to a request, including a category and a keyword, from a user, the method comprising:

(a) constructing a database containing a plurality of categories and, for each category, at least one URL for one of the plurality of merchant sites;

(b) Composing a query in response to the request category by concatenating a URL obtained from the database with the request category with the request keyword;

(c) using a search engine to retrieve information from the plurality of merchant sites with the query;

(d) creating an automatic learning object for processing retrieved information to extract the item information; and (e) wherein step (b) comprises composing a plurality of queries for the requested category and wherein step (d) comprises creating a plurality of automatic learning objects in parallel with one automatic learning object being created to process information retrieved from each query.

9. A method according to claim 8 wherein step (b) comprises composing a plurality of queries for the requested category and wherein step (c) comprises using a plurality of search engines in parallel with one search engine being used for each query.

10. A method according to claim 8 wherein step (d) comprises:

(d1) removing formatting information in the retrieved information; and (d2) parsing the filtered information into one or more data trees, each data tree having one or more nodes.

11. A method according to claim 10 wherein step (d) further comprises:

(d3) examining each node for relevant information; and (d4) extracting the item information from the relevant information.

12. A method according to claim 8 wherein the retrieved information is coded in HTML code and wherein step (d) comprises processing the HTML code to remove HTML formatting tags.

13. A method according to claim 8 wherein the retrieved information is coded in XML code and wherein step (d) comprises processing the XML code to remove XML formatting tags.

14. A method according to claim 8 wherein the database is constructed to include at least one URL for a search engine located in one of the plurality of merchant sites.

15. A computer program product for retrieving comparative item information from a plurality of merchant sites having disparate information formats in response to a request, including a category and a keyword, from a user, the computer program product comprising a computer usable medium having computer readable program code thereon, including:

program code for constructing a database containing a plurality of categories and, for each category, at least one URL for one of the plurality of merchant sites;

program code for composing a query in response to the request category by concatenating a URL obtained from the database with the request category with the request keyword;

program code for creating a search engine to retrieve information from the plurality of merchant sites with the query;

program code for creating an automatic learning object for processing retrieved information to extract the item information; and wherein the program code for composing a query comprises program code for composing a plurality of queries for the requested category and wherein the program code for creating a search engine comprises program code for creating a plurality of automatic learning objects in parallel with one automatic learning object being created to process information retrieved from each query.

16. A computer program product according to claim 15 wherein the program code for composing a query comprises program code for composing a plurality of queries for the requested category and wherein the program code for creating a search engine comprises program code for creating a plurality of search engines in parallel with one search engine being used for each query.

17. A computer program product according to claim 15 wherein the program code for creating an automatic learning object comprises:

program code for removing formatting information in the retrieved information; and program code for parsing the filtered information into one or more data trees, each data tree having one or more nodes.

18. A computer program product according to claim 17 wherein the program code for creating an automatic learning object further comprises:

program code for examining each node for relevant information; and program code for extracting the item information from the relevant information.

19. A computer program product according to claim 15 wherein the retrieved information is coded in HTML code and wherein the program code for creating an automatic learning object comprises program code for processing the HTML code to remove HTML formatting tags.

20. A computer program product according to claim 15 wherein the retrieved information is coded in XML code and wherein the program code for creating an automatic learning object comprises program code for processing the XML code to remove XML formatting tags.

21. A computer program product according to claim 15 wherein the database is constructed to include at least one URL for a search engine located in one of the plurality of merchant sites.

22. A computer data signal embodied in a carrier wave for retrieving comparative item information from a plurality of merchant sites having disparate information formats in response to a request, including a category and a keyword, from a user, the computer data signal comprising:

program code for constructing a database containing a plurality of catageories and, for each category, at least one URL for one of the plurality of merchant sites;

program code for composing a query in response to the request category by concatenating a URL obtained from the database with the request category with the request keyword;

program code for creating a search engine to retrieve information from the plurality of merchant sites with the query;

program code for creating an automatic learning object for processing retrieved information to extract the item information; and wherein the program code for composing a query comprises program code for composing a plurality of queries for the requested category and wherein the program code for creating a search engine comprises program code for creating a plurality of automatic learning objects in parallel with one automatic learning object being created to process information retrieved from each query.

23. A computer data signal according to claim 22 wherein the program code for composing a query comprises program code for composing a plurality of queries for the requested category and wherein the program code for creating a search engine comprises program code for creating a plurality of search engines in parallel with one search engine being used for each query.

24. A computer data signal according to claim 20 wherein the program code for creating an automatic learning object comprises:

program code for removing formatting information in the retrieved information; and program code for parsing the filtered information into one or more data trees, each data tree having one or more nodes.

25. A computer program product according to claim 22 wherein the database is constructed to include at least one URL for a search engine located in one of the plurality of merchant sites.

\* \* \* \* \*

UNITED STATES PATENT AND TRADEMARK OFFICE
CERTIFICATE OF CORRECTION

PATENT NO. : 6,381,597 B1
DATED : April 30, 2002
INVENTOR(S) : Simon M. Lin

It is certified that error appears in the above-identified patent and that said Letters Patent is hereby corrected as shown below:

Column 13,
Line 49, after "parallel with", please insert -- one --;

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.      : 6,381,597 B1
DATED           : April 30, 2002
INVENTOR(S)     : Simon M. Lin It is certified that error appears in the above-identified patent and that said Letters Patent is hereby corrected as shown below:

Column 16,
Line 41, please replace "according to claim 20" with -- according to claim 22 --

Signed and Sealed this

Twenty-sixth Day of August, 2003

JAMES E. ROGAN
*Director of the United States Patent and Trademark Office*